United States Patent [19]

van der Lely

[11] 4,136,745
[45] Jan. 30, 1979

[54] SOIL CULTIVATING IMPLEMENTS

[76] Inventor: Cornelis van der Lely, 7, Brüschenrain, Zug, Switzerland

[21] Appl. No.: 754,228

[22] Filed: Dec. 27, 1976

[30] Foreign Application Priority Data

Dec. 31, 1975 [NL] Netherlands .................. 7515219

[51] Int. Cl.² .................................. A01B 39/10
[52] U.S. Cl. ................................ 172/63; 172/40; 172/711
[58] Field of Search .............. 172/40, 54, 53, 63, 172/197, 199, 711, 47, 49, 50, 59, 70, 71, 72, 103, 112, 145, 148, 200, 767, 150, 439, 421

[56] References Cited

U.S. PATENT DOCUMENTS

| 2,671,386 | 3/1954 | Kerridge | 172/40 X |
| 2,871,956 | 2/1959 | Boyd-Brent | 172/72 |
| 3,209,841 | 10/1965 | Lely et al. | 172/711 |
| 3,396,804 | 8/1968 | Rogers | 172/40 |
| 3,448,813 | 6/1969 | Rogers | 172/40 |
| 3,559,747 | 5/1968 | Cline | 172/421 |
| 3,630,290 | 12/1971 | Williams et al. | 172/439 X |
| 3,774,688 | 11/1973 | Lely et al. | 172/59 X |
| 3,783,948 | 1/1974 | Lely et al. | 172/49 |

FOREIGN PATENT DOCUMENTS 2023273 12/1970 Fed. Rep. of Germany ............ 172/40
6607177 11/1967 Netherlands .................. 172/40

Primary Examiner—Paul E. Shapiro
Attorney, Agent, or Firm—Mason, Mason and Albright

[57] ABSTRACT

An implement has one or more rows of tines fixed to frame beams and the lateral sides of the frame have adjustable ground wheels to control the working depths of the tines. A further soil working member is connected at the rear of the frame by parallelogram linkages and a driven eccentric on the further member imparts up and down vibratory movements to that member. Each linkage includes a bracket, the lower front portion of which is pivoted to a rear frame beam and rearwardly extending arms that are pivoted to vertical support arms that carry and move the further member. Above the pivot connection to the frame, the bracket has connection points for a tie arm that extends forward to a leading frame beam. A fixing mechanism interconnects the upper linkage arm with the front of the bracket at two spaced apart locations and springs in the mechanism bias the arm and further member to an equilibrium position. The angularity of the linkages can be changed with the bracket connections to the tie arms and/or mechanism. The further member includes transverse rods that define a convex ground-engaging surface.

34 Claims, 4 Drawing Figures

SOIL CULTIVATING IMPLEMENTS

Figure 1:
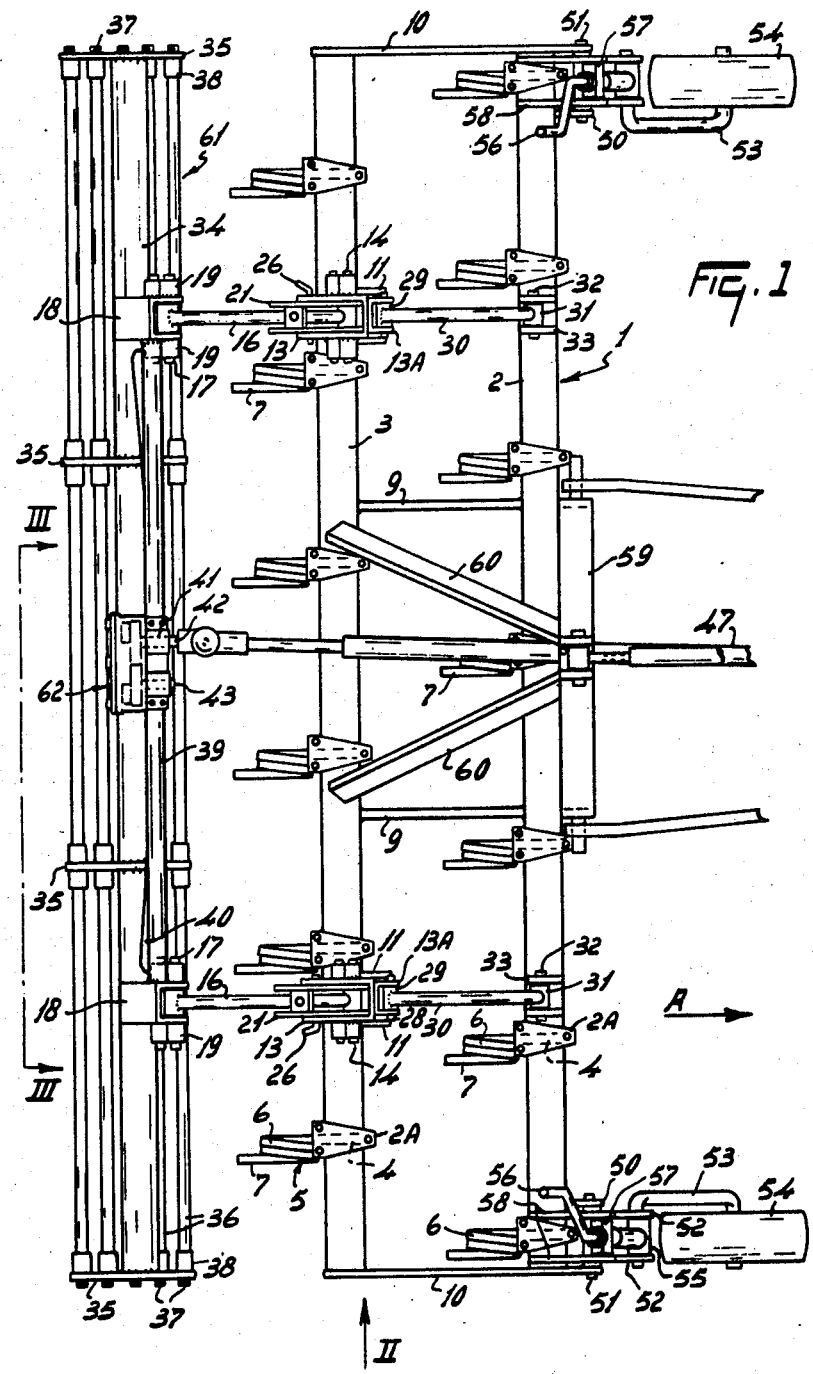
Figure 2:
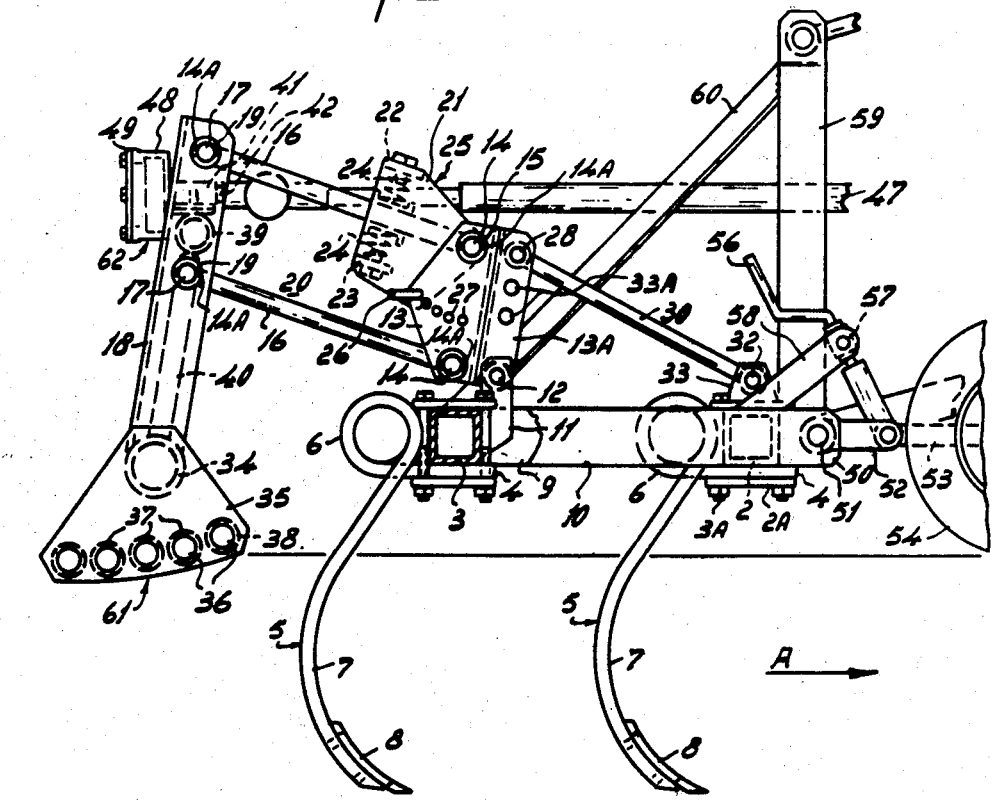
Figure 3:
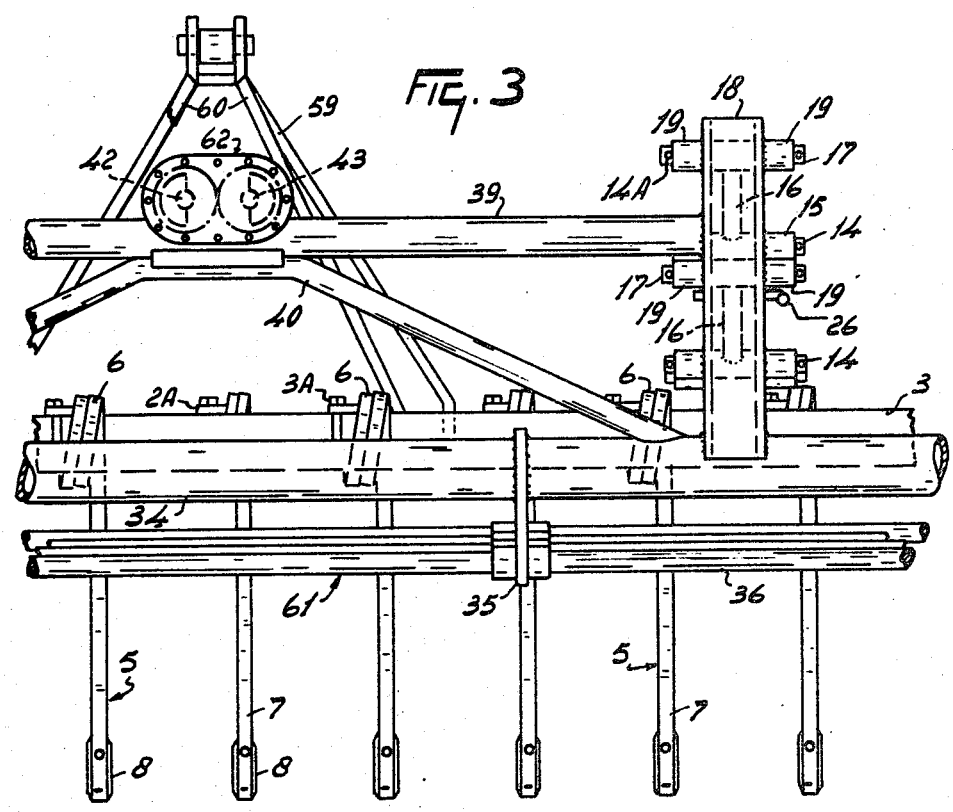
Figure 4:
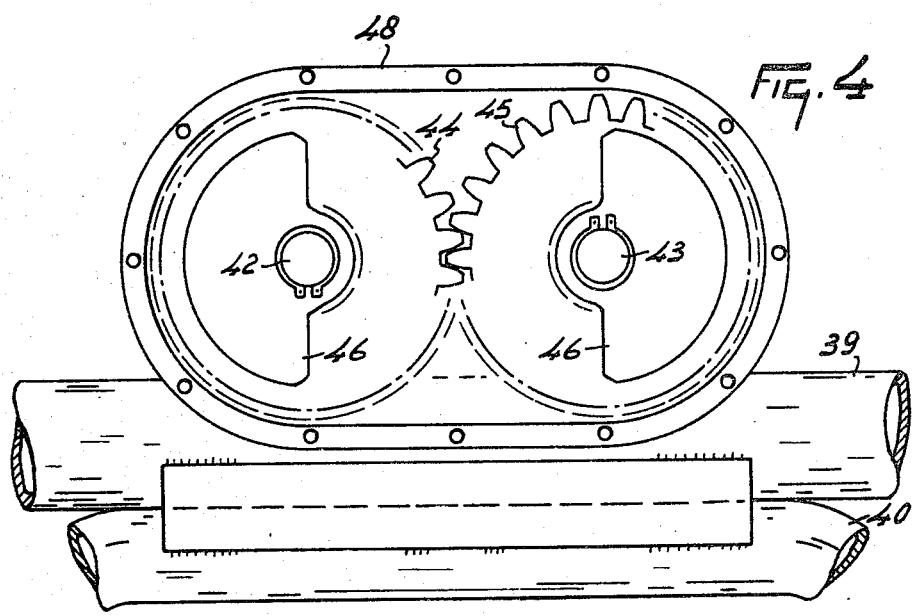

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor or other operating vehicle, FIG. 2 is a side elevation of the implement of FIG. 1 as seen in the direction indicated by an arrow II in that Figure, FIG. 3 is a partial rear elevation of the implement of FIGS. 1 and 2 as seen in the direction indicated by arrows III—III in FIG. 1, and FIG. 4 is a rear elevation, to an enlarged scale, illustrating the construction and arrangement of an eccentric mechanism of the implement in greater detail.

Referring to the accompanying drawings, the soil cultivating implement that is illustrated therein has a frame that is generally indicated by the reference 1, said frame comprising two beams 2 and 3 that extend substantially horizontally parallel to one another and substantially perpendicular, or at least transverse, to the intended direction of operative travel of the implement that is indicated in FIGS. 1 and 2 of the drawings by an arrow A. The two frame beams 2 and 3 are spaced from one another in the direction A and each of them has a hollow formation and a polygonal cross-section which it is preferred should be the square cross-section that is illustrated. Whatever polygonal cross-section is employed, it should be one that enables both upper and lower surfaces of the beam 2 or 3 concerned to be horizontally or substantially horizontally disposed. The leading frame beam 2, with respect to the direction A, is provided with a row of seven cultivator tines 5 that are spaced apart from one another at regular intervals along that row and, similarly, the rear frame beam 3, with respect to the same direction, is provided with a row of six cultivator tines 5 that are spaced apart from one another along said row by the same regular intervals as are the tines 5 of the leading row. It can be seen from FIGS. 1 and 3 of the drawings that, when the implement is viewed from the rear in the direction A (FIG. 3), the cultivator tines 5 of the rear row thereof are disposed alternately midway between the cultivator tines 5 of the leading row. Each cultivator tine 5 is formed from spring steel or other resilient material having a polygonal cross-section which is preferably the square cross-section that is illustrated. Each tine 5 has a substantially horizontally disposed fastening portion 4 that extends substantially parallel to the direction A, said fastening portion 4 being firmly but releasably clamped to the lower surface of the corresponding beam 2 or 3 by a pair of upper and lower clamping plates 2A that are both of substantially, but not exactly, trapezoidal configuration and a corresponding group of three substantially vertically disposed bolts 3A. The rearmost end of each cultivator tine fastening portion 4 merges integrally into a helical coil 6 that lies immediately behind the beam 2 or 3 concerned with respect to the direction A. The end of each coil 6 that is remote from the corresponding fastening portion 4 merges integrally into a soil working portion 7 of the respective tine 5, said portion 7 being inclined downwardly and rearwardly with respect to the direction A from its upper end but being subsequently directed forwardly in a regularly curved manner so that its lowermost end is inclined downwardly and forwardly with respect to the direction A. The forwardly facing concave surface of the lower end of the soil working portion 7 of each cultivator tine 5 is provided with a tip in the form of a blade 8. The blades 8 are replaceably mounted by countersunk machine screws or in some other manner that is not illustrated in detail since it is not relevant to the present invention. Each blade 8 can preferably be inverted after its leading cutting edge has become blunt so as to present a fresh forwardly directed cutting edge and this, it will be realized, substantially doubles the effective working life of each blade 8. The fastening portion 4, coil 6 and soil working portion 7 of each cultivator tine 5 are, it is emphasized, of integral formation and only the corresponding blade 8 is releasably connected to the remainder of the tine 5.

The ends of the frame beams 2 and 3 are rigidly interconnected by strip-shaped side plates 10 that are substantially vertically parallel to one another and to the direction A. Two supports 9 that also extend substantially parallel to one another and to the direction A also rigidly interconnect the frame beams 2 and 3 at two locations which are spaced by equal distances from the midpoints of those two beams. It will be noted from FIGS. 1 and 2 of the drawings that the two strip-shaped side plates 10 of the frame 1 extend forwardly beyond the leading frame beam 2 of that frame by short distances. The rear frame beam 3 is provided, at two locations that are spaced inwardly towards its midpoint by equal distances from its opposite ends, with pairs of upright support plates 11, each pair of upright support plates 11 having the lower end of a corresponding forked bracket 13A turnably mounted therebetween by a horizontal pivot pin 12 that perpendicularly interconnects the upper ends of the two support plates 11 under consideration. The axes of the two pivot pins 12 are substantially coincident and extend substantially parallel to the longitudinal axes of the two frame beams 2 and 3. The web or base of each forked bracket 13A is at the rear of that bracket with respect to the direction A and is welded or otherwise rigidly secured to the web or base of a further forked bracket 13. As will be evident from the drawings, the web or base of each further forked bracket 13 is at the front of that bracket with respect to the direction A so that its spaced limbs project rearwardly from said web or base in substantially parallel relationship with each other and with the direction A. The shape of each limb of each further forked bracket 13 can be seen best in FIG. 2 of the drawings and is such as to define two rearwardly convergent edges that meet at a shallow V-shaped point which is directed towards the back of the implement.

The two limbs of each further forked bracket 13 are formed close to their upper and lower edges with horizontally aligned holes and the outer surfaces of said limbs have sleeves 15 welded or otherwise rigidly secured to them with the coincident longitudinal axes of said sleeves 15 in register with said holes. Upper and lower horizontal pivot pins 14 are entered axially through each pair of sleeves 15 and the holes in the limbs of the corresponding further forked bracket 13 and, where said pins 14 extend between said bracket limbs, they are surrounded by bearing sleeves at the leading ends of corresponding upper and lower arms 16. Axial displacement of the pivot pins 14 through the sleeves 15 and intervening bearing sleeves is prevented by entering small retaining pins 14A through transverse holes that are formed at the opposite ends of the pivot pins 14 immediately beyond the neighbouring ends of the sleeves 15. The upper and lower arms 16 extend generally rearwardly with respect to the direction A from the bearing sleeves that are carried at their leading ends and their rearmost ends are provided with further similar bearing sleeves that are turnably mounted by substantially horizontal pivot pins 17 between the forwardly directed limbs of corresponding upwardly extending arms 18 of channel-shaped cross-section. The pivot pins 17 co-operate with sleeves 19 that are welded or otherwise rigidly secured to the outer surfaces of the limbs of the arms 18 in substantially the same manner as has already been described for the sleeves 15 and pivot pins 14, additional transverse retaining pins 14A being used to prevent unwanted displacement of the pivot pins 17 axially through the sleeves 19.

The arms 16 of each upper and lower pair extend substantially parallel to each other and form parts of a corresponding pivotable linkage which, in the case of the embodiment that is being described, is in the form of a parallelogram linkage that is generally indicated by the reference 20. The four pivotal axes of each parallelogram linkage 20 are afforded by the respective pairs of upper and lower pivot pins 14 and 17 and it will be appreciated that, with the described arrangement, each arm 18 can move upwardly or downwardly relative to the corresponding further forked bracket 13 without signigicant tilting. The upper pivot pin 14 of each parallelogram linkage 20 has two parallel and substantially vertically disposed plates 21 turnably mounted on it immediately alongside the inner surfaces of the rearwardly directed limbs of the corresponding further forked bracket 13. The plates 21 are of an irregular polygonal shape which can be seen in FIG. 2 of the drawings and it will be noted from that Figure that it is the leading corners of the plates with respect to the direction A that are turnably mounted on the pivot pins 14, the two plates 21 of each pair being located at opposite sides of the corresponding intervening upper arm 16. The two plates 21 of each pair are rigidly interconnected, near upper and lower rear corners thereof, by upper and lower transverse plates 22 and 23. Upper and lower locating plates whose positions can be seen in FIG. 2 of the drawings are secured to the upper arm 16 of each parallelogram linkage 20 and upper and lower helical compression springs 24 whose longitudinal axes are substantially aligned extend between locating bolts carried by the upper and lower transverse plates 22 and 23 and the opposed locating plates on the upper arm 16 concerned.

The two limbs of each further forked bracket 13 are formed with curved rows of holes 27 that are all equidistant from the longitudinal axis of the corresponding upper pivot pin 14 and the two plates 21 of each pair are formed, close to lowermost corners thereof, with a single pair of horizontally aligned holes that are at the same distance from the axis of the respective upper pivot pin 14 as are said holes 27. It will be evident that the pairs of interconnected plates 21 can be turned upwardly and downwardly about the corresponding upper pivot pin 14 to bring the aligned holes therein into intervening register with any chosen pair of the corresponding holes 27 and it will be seen from the drawings that horizontal locking pins 26 are provided for entry through the chosen holes 27 and the holes in the intervening plates 21 to retain said plates 21 in an angular position about the axis of the corresponding upper pivot pin 14 that is dependent upon the particular pair of holes 27 which is selected. The pairs of plates 21 constitute a fixing mechanism that is generally indicated by the reference 25 and, once one particular position of the fixing mechanism 25 has been selected by choosing appropriate pairs of the holes 27 for co-operation with the locking pins 26, the angularity of the two parallelogram linkages 20 can be varied only between the limits dictated by abutment of the upper arms 16 against the upper and lower transverse plates 22 and 23 and against the opposition of either the upper or lower helical compression springs 24, said springs 24 tending to maintain the parallelogram linkages 20 in a central equilibrium position that will be different for each possible setting of the fixing mechanism 25.

The upper ends of the two forwardly directed limbs of each forked bracket 13A are perpendicularly interconnected by a corresponding substantially horizontal pivot pin 28 and a bearing sleeve 29 at the rearmost end of a corresponding arm 30 is turnably mounted around said pivot pin 28 between the limbs of the bracket 13A under consideration. The arms 30 extend downwardly and forwardly with respect to the direction A from the pivot pins 28 and their leading ends carry further bearing sleeves 31 that are turnable about horizontal pivot pins 32 between pairs of upright lugs 33 that are welded or otherwise rigidly secured to the top surface of the leading frame beam 2. As illustrated in the drawings, and as has just been described, the bearing sleeves 29 at the upper and rear ends of the arms 30 are connected to the limbs of the forked brackets 13A by the pivot pins 28 at locations close to the uppermost ends of those forked brackets. However, the limbs of each forked bracket 13A are formed at two different lower levels with horizontally aligned pairs of holes 33A and it is particularly noted that the pivot pins 28 can be withdrawn from their illustrated positions and can be used to couple the bearing sleeves 29 to the brackets 13A at two other and lower levels which correspond to the employment of either the upper holes 33A or the lower holes 33A. This arrangement is such that, as seen in FIG. 2 of the drawings, when either pair of holes 33A in the limbs of each bracket 13A are employed, that bracket, and the parts which are connected to the rear thereof, will be displaced angularly in an anticlockwise direction about the corresponding pivot pin 12 as compared with the illustrated condition.

The lowermost ends of the two upwardly extending arms 18 that are of channel-shaped cross-section are rigidly interconnected by a tubular carrier 34 that is substantially horizontally disposed, said carrier 34 being parallel or substantially parallel to the frame beams 2 and 3 and having such a length that it extends outwardly beyond the two arms 18 to have its opposite ends substantially in register, in the direction A, with the two side plates 10 of the frame 1 as seen in the plan view of FIG. 1 of the drawings. The tubular carrier 34 thus has substantially the same axial length as does each of the frame beams 2 and 3. Four similar support plates 35 which have the shape that can be seen in respect of one of them in FIG. 2 of the drawings are secured to the tubular carrier 34 at its opposite ends and at two regularly space apart intervals along its length, the four support plates 35 being substantially vertically disposed, parallel to one another and substantially parallel to the direction A with each of them extending principally downwardly towards the ground surface from the carrier 34. Each support plate 35 is somewhat sectorshaped and has a lowermost convexly curved edge that faces and/or penetrates into the ground surface. The four support plates are each formed near to the lowermost curved edge thereof with five holes and each hole has a corresponding substantially horizontally disposed sleeve 38, or pair of sleeves 38 (see FIG. 1), secured to it so as to register with the holes concerned. The sleeves 38 and the holes in the support plates 35 receive five elongate elements 36 that all extend parallel or substantially parallel to the tubular carrier 34 at regularly spaced apart intervals. The elongate elements 36 are of circular or substantially circular cross-section and preferably have the solid rod-like formation that is illustrated although a tubular formation could be adopted as an alternative. The elements 36 extend through the sleeves 38 and the aligned holes in the support plates 35 with some clearance and therefore, with the preferred circular cross-section that is illustrated, can turn about their own longitudinal axes in the sleeves 38. The elements 36 are not, however, axially displaceable relative to the support plates 35 to any appreciable extent and such axial displacement is substantially prevented by entering so-called "safety" pins 37 through transverse holes formed at the extreme opposite ends of the elements 36 alongside the relatively remote surfaces of the outermost support plates 35.

A tubular tie beam 39 (FIG. 3) rigidly interconnects the two upwardly extending arms 18 and extends perpendicular or substantially perpendicular to the direction A. The tie beam 39 is rigidly secured, midway along its length, to a short substantially horizontally disposed central portion of an angularly arched beam 40 which has two symmetrically opposed limbs that diverge downwardly and outwardly from the substantially horizontally disposed portion to have their lowermost and outermost ends rigidly secured to the top of the tubular carrier 34 close to the points at which the lower ends of the corresponding arms 18 are also secured to that carrier 34. The top of the tie beam 39 is provided, above the central substantially horizontally disposed portion of the arched beam 40 that is rigidly secured thereto, with two bearings 41 that are in parallel relationship with each other and substantially parallel relationship with the direction A. Each of the two bearings 41 rotatably supports a corresponding one of two substantially horizontal shafts 42 and 43, the rearmost ends of said two shafts 42 and 43 that project from behind the bearings 41 being provided with corresponding toothed pinions 44 and 45 that are in intermeshing relationship (see FIG. 4). The shafts 42 and 43 are splined or otherwise keyed to co-operate with matchingly splined or otherwise keyed hubs of the two pinions 44 and 45 and with matchingly splined or otherwise keyed portions of two eccentric weights 46 that are arranged on the shafts 42 and 43 immediately to the rear of the corresponding pinions 44 and 45. Circlips (FIG. 4) maintain the axial positions of the weights 46 and pinions 44 and 45 on the two shafts 42 and 43. The drawings illustrate a position of the two eccentric weights 46 in which they are 180°, or substantially 180°, out of phase with one another around the longitudinal axes of the corresponding shafts 42 and 43 as regards their respective eccentricities and it will be realised that, since the pinions 44 and 45 are in mesh with each other, the two weights 46 will always be substantially symmetrically disposed with respect to a vertical plane that is parallel to the direction A and that is located midway between the also parallel longitudinal axes of the two shafts 42 and 43. The leading end of the shaft 42 projects forwardly beyond the corresponding bearing 41 for a greater distance than does the shaft 43 and is splined or otherwise keyed to enable it to be placed in driven connection with the power take-off shaft of an agricultural tractor or other operating vehicle through the intermediary of a telescopic transmission shaft 47, which is of a construction that is known per se, having universal joints at its opposite ends. The pinions 44 and 45 and the associated eccentric weights 46 are enclosed in a housing 48 which has a substantially vertical cover plate 49 releasably bolted to its back to enable access to be obtained to the interior of the housing 48 when required.

Two lugs 50 are secured to the leading frame beam 2 at short distances inwardly from the opposite ends of that beam so as to project forwardly therefrom in parallel relationship with the respectively neighboring strip-shaped side plates 10 of the frame 1 and the leading ends of said side plates 10 and neighboring lugs 50 are perpendicularly interconnected by substantially horizontally aligned stub shafts 51 that extend parallel or substantially parallel to the two frame beams 2 and 3. Sleeves turnably surround the two stub shafts 51 and each sleeve has a corresponding pair of spaced strips 52 secured thereto so as to project generally forwardly therefrom with respect to the direction A. The leading ends of each pair of strips 52 are interconnected by one limb of a corresponding rigid bracket 53. The two brackets 53 have base portions that project generally forwardly with respect to the direction A from said limbs and the leading ends of the base portions are perpendicularly bent over to form further limbs that are parallel to the limbs which co-operate with the strips 52. Said further limbs constitute axles upon which corresponding ground wheels 54 are rotatably mounted. That limb of each bracket 53 that is secured to the corresponding pair of strips 52 is surrounded, between those strips 52, by a sleeve 55. The sleeves 55 are turnable about the limbs of the brackets 53 and substantially their midpoints are connected to the lower ends of corresponding internally screwthreaded cylinders. Pairs of support arms 58 project obliquely upwardly and forwardly with respect to the direction A from the top of the leading frame beam 2 at two locations which are close to the opposite ends of that beam and which are thus such that parts of said arms 58 lie above the stub shafts 51 as seen in plan view (FIG. 1). The upper leading ends of each pair of support arms 58 turnably carry, by means of trunnion pins, a corresponding block 57 which is formed with a plain transverse bore whose axis is perpendicular to that of the corresponding trunnion pins. A plain portion of the shank of a rotatable spindle 56 is rotatably received in the plain bore of each block 57, stops being provided to prevent any significant axial displacement of the spindle 56 relative to the corresponding block 57. Each spindle 56 has a manually operable crank handle at its upper end and its lower end is screwthreaded and is entered into the corresponding internally screwthreaded cylinder that is connected to the respective sleeve 55. It will be evident that the strips 52, brackets 53 and ground wheels 54 will be turned upwardly or downwardly about the common axis of the stub shafts 51 upon manually rotating the crank handles at the upper ends of the spindles 56 in appropriate directions.

The front of the leading frame beam 2 with respect to the direction A is provided, midway between the general planes of the two side plates 10, with a coupling member or trestle 59 that is of generally triangular configuration as seen in front or rear (FIG. 3) elevation. Substantially the apex of the coupling member or trestle 59 is rigidly connected to two horizontally spaced apart locations on the top of the rear beam 3 of the frame 1 by two downwardly and rearwardly divergent tie strips 60.

In the use of the soil cultivating implement that has been described, the coupling member or trestle 59 is employed in the generally known manner that is illustrated in outline in the drawings in connecting the frame 1 to the three-point lifting device or hitch at the rear of an agricultural tractor or other operating vehicle and the leading end of the shaft 42 is placed in driven connection with the rear power take-off shaft of the same tractor or other operating vehicle by way of the known intermediate telescopic transmission shaft 47 that has universal joints at its opposite ends. Before work commences, the maximum depth to which the cultivator tines 5 can pentrate into the soil is adjusted by manually rotating the two spindles 56 with a resultant lowering or raising of the frame 1 relative to the ground surface as the ground wheels 54 are bodily displaced either downwardly or upwardly with respect to the frame 1. The elongate elements 36 together afford a soil working member that is generally indicated by the reference 61, said elements 36 being movably supported by the plates 35 which plates are rigidly secured to the tubular carrier 34. The level of the soil working member 61 is adjusted to match the depth settling of the cultivator tines 5 by displacing said member 61 either upwardly, or downwardly, relative to the frame 1 employing the fixing mechanism 25 and, in particular, the locking pins 26 to retain the two parallelogram linkages 20 in appropriate positions of angularity from which, it will be remembered, they are displaceable to some extent, both upwardly and downwardly, against the action of the opposed compression springs 24. FIG. 2 of the drawings illustrates a working position of the implement in which the cultivator tines 5 are set at substantially their maximum working depths and the locking pins 26 consequently co-operate with those holes 27 which correspond to the soil working member 61 being at its highest possible equilibrium position relative to the frame 1.

During operative progress in the direction A, the soil working member 61 bears against, and usually penetrates into to some extent, the soil that has been broken up by the immediately foregoing cultivator tines 5, said soil working member 61 being constantly vibrated wholly or principally in upward and downward directions by an eccentric mechanism which comprises the shafts 42 and 43, the pinions 44 and 45 and the eccentric weights 46, said eccentric mechanism being generally indicated by the reference 62. The eccentric mechanism 62 is located between the two parallelogram linkages 20 when the implement is viewed from the rear in the direction A (FIG. 3) and is, of course, powdered from the tractor or other operating vehicle through the intermediary of the telescopic transmission shaft 47. The shaft 47 directly drives the shaft 42 of the mechanism 62, the rotation of the shaft 42 causing rotation of the shaft 43 at the same speed, but in the opposite direction, because of the provision of the substantially identical and intermeshing pinions 44 and 45. The previously described arrangement of the eccentric weights 46 of the mechanism 62 is such that the upward and downward components of their rotary movements are complementary while the horizontal components of their movements substantially counterbalance one another and said mechanism 62 thus tends to move the tie beam 39 to which it is connected rapidly upwards and downwards with very little, if any, tendency to lateral displacement. The beam 39 is connected to the tubular carrier 34 both by the arms 18 and the angularly arched beam 40 so that the soil working member 61 that is connected to the carrier 34 is similarly caused to perform a rapid upward and downward movement which is effectively of a vibratory nature. It will be realized that this upward and downward movement of the soil working member 61 takes place against the opposing and thus restoring action of the springs 24 and would not be possible, substantially independently of the frame 1, if the locking pins 26 were arranged to maintain the parallelogram linkages 20 in completely fixed positions of angularity. The rapid upward and downward substantially vibratory movement of the soil working member 61 causes its elongate elements 36 to perform an intensive and very effective crumbling action upon the lumps of soil produced by the immediately foregoing cultivator tines 5, a gentle compressing and levelling effect also being produced. The upward and downward motion of the soil working member 61 is enhanced by the influence thereon of the springs 24 and its intensity can be adjusted by using the pivot pins 28 to connect the rear ends of the arms 30 to the limbs of the forked brackets 13A at one of the lower levels that is possible by utilising the alternative holes 33A (FIG. 2) that are formed in the forwardly directed limbs of said brackets 13A.

The implement that has been described is very effective in loosening and breaking up at least upper layers of soil by means of its cultivator tines 5 and is equally effective in thoroughly crumbling and levelling that soil by means of the immediately following upwardly and downwardly vibratory soil working member 61. The lowermost extremities of the five elongate elements 36 of the member 61 present, like the lower edges of the support plates 35, a skeletal cylindrically curved downwardly facing surface that is convex in shape. This feature, together with the circular cross-sections and movability of the elements 36, tends to prevent even quite sticky soil from adhering to the member 61 in disadvantageous quantities for any lengths of time. The fact that the skeletal cylindrical surface which is afforded by the bottoms of the five elongate elements 36 extends generally downwardly and rearwardly with respect to the direction A at a few degrees to the horizontal (see FIG. 2) has an advantageous effect upon the soil crumbling action which the member 61 produces during operative progress in the direction A. When the implement is to be transported from one place to another without performing any working operation, it is lifted clear of contact with the ground by raising the three-point lifting device or hitch of the tractor or other operating vehicle to which its coupling member or trestle 59 is connected.

Although certain features of the soil cultivating implement that have been described and/or that are illustrated in the accompanying drawings will be set forth in the following claims as inventive features, it is emphasized that the invention is not necessarily limited to those features and that is includes within its scope each of the parts of the soil cultivating implement that has been described, and/or that is illustrated in the accompanying drawings, both individually and in various combinations.

What we claim is:

1. A cultivating implement comprising a frame and tine means connected to said frame, said frame having coupling means at the front thereof, for connection to a prime mover, with respect to the normal direction of implement travel and means adjusting the working depth of said tine means, a further soil working member being linked to said frame by at least one linkage and said further member being supported by the frame at the rear of said tine means to further work the soil, fixing means connected to said linkage and said fixing means being interconnected to said frame to set the working level of said further member with respect to said tine means, driving means connected to move said further member in up and down movements relative to said fixing means, said further member being pivoted upwardly and downwardly on said linkage and said driving means including an eccentric that vibrates said further member, said linkage comprising vertically spaced apart arms and at least one of said arms being associated with a spring mechanism that bears on the upper and lower sides of said one arm.

2. A soil cultivating implement as claimed in claim 1, wherein said further member is linked to said frame by at least two spaced apart pivotable linkages and said fixing mechanism retaining said linkages in any one of a plurality of different positions of angularity about pivotal axes, whereby said further member is settable in different working levels relative to said frame.

3. An implement as claimed in claim 2, wherein each linkage comprises vertically spaced apart arms and at least one of said arms is associated with compression springs that bear on the upper and lower sides thereof.

4. An implement as claimed in claim 3, wherein said springs and said arm are angularly displaceable together about the axis of a pivotal connection between said arm and an upwardly extending part of a corresponding linkage, said fixing means retaining said springs and upper arm in a chosen angular position about said axis.

5. An implement as claimed in claim 4, wherein said part is a bracket and the lower portion of said bracket is pivotably connected to said frame.

6. An implement as claimed in claim 5, wherein a tie arm interconnects said bracket and said frame.

7. An implement as claimed in claim 6, wherein said tie arm is pivoted to both said bracket and said frame.

8. An implement as claimed in claim 7, wherein said tie arm is connectable to said bracket at any chosen one of a plurality of relatively spaced apart locations and these locations are above the pivot connection between said bracket and frame.

9. An implement as claimed in claim 8, wherein said bracket is located in advance of the remainder of the corresponding linkage.

10. An implement as claimed in claim 3, wherein said fixing means is a mechanism that includes plates and said springs bear between said arm and said plates.

11. An implement as claimed in claim 10, wherein said mechansim comprises two plates that are interconnected and sepatated by further upper and lower transverse plates, at least two compression springs being located between said first mentioned plates and bearing between said transverse plates and the lower and upper sides of said arm.

12. A cultivating implement comprising a frame and a plurality of tines fixed to said frame, said frame having coupling means at the front thereof, for connection to a prime mover, with respect to the normal direction of implement travel and means adjusting the working depths of said tines, a further soil working member being linked to said frame by spaced apart linkages, said further member being supported by said frame at the rear of said tines to further work the soil, said linkages each including an upper arm and a lower arm, the forward portions of the arms being pivoted to bracket means connected to the frame, a fixing mechansim including plates, being pivoted to the bracket means and at least one spring of said mechanism bearing on said upper arm to urge said linkage and further working member into an equilibrium position, said plates being adjustably connected to the bracket means and driving means connected to impart vibratory movements to said further member, which movements are opposed by said spring.

13. An implement as claimed in claim 12, wherein the vibratory movements of said further working member include oscillatory changes in the angularity of each linkage.

14. An implement as claimed in claim 13, wherein said linkage is a parallelogram linkage.

15. An implement as claimed in claim 14, wherein said further working member is elongated and extends transverse to the direction of travel.

16. An implement as claimed in claim 15, wherein said further working member comprises a carrier that extends transverse to the direction of travel and said carrier is interconnected with the rear portions of two spaced apart parallelogram linkages.

17. An implement as claimed in claim 16, wherein said driving means includes an eccentric mechanism that is positioned between said two parallelogram linkages.

18. An implement as claimed in claim 17, wherein said eccentric mechanism is secured to a tie beam that extends transverse to the direction of travel and said beam interconnects said linkages.

19. An implement as claimed in claim 18, wherein said eccentric mechanism comprises two intermeshing toothed pinions that are supported on said beam.

20. An implement as claimed in claim 19, wherein one of said pinions is mounted on a shaft that is drivenly engaged by the power take-off shaft of a prime mover.

21. An implement as claimed in claim 20, wherein each pinion comprises a respective eccentric weight.

22. An implement as claimed in claim 21, wherein, in one position, the two eccentric weights are 180° out of phase with each other about the axes of rotation of their corresponding pinions as regards their eccentricities.

23. An implement as claimed in claim 12, wherein said further working member comprises a plurality of spaced apart supports mounted on a carrier and a plurality of elongated elements that extend transverse to the direction of the travel, said elements being held by the supports adjacent the bottoms thereof.

24. An implement as claimed in claim 23, wherein said elements are arranged in substantially regularly spaced apart relationship and are substantially parallel to one another.

25. An implement as claimed in claim 23, wherein the lowermost extremities of said elements define a cylindrically curved surface and the convex side thereof faces downwardly towards the ground.

26. An implement as claimed in claim 15, wherein said elements are located in holes adjacent lower edges of said supports and said edges have a convex configuration that faces downwardly.

27. An implement as claimed in claim 26, wherein said elements are circular which are turnable about their longitudinal axes in sleeves secured to said supports.

28. An implement as claimed in claim 12, wherein said tines are positioned in at least one row which extends transverse to the direction of travel.

29. An implement as claimed in claim 28, wherein there are two rows of tines, one positioned behind the other with respect to the direction of travel.

30. An implement as claimed in claim 29, wherein the tines of a forward row are positioned between the tines of a rear row.

31. An implement as claimed in claim 30, wherein said tines are spring steel of substantially square cross-section.

32. An implement as claimed in claim 12, wherein adjustable depth control ground wheels are connected to the front lateral sides of said frame and said wheels are upwardly and downwardly displaceable relative to the frame.

33. An implement as claimed in claim 32, wherein said wheels have mounts and each mount comprises a screwthreaded spindle.

34. A cultivating implement comprising a frame and tine means connected to said frame, said frame having coupling means at the front thereof, for connection to a prime mover, with respect to the normal direction of implement travel and means adjusting the working depth of said tine means, a further soil working member being linked to said frame by at least one linkage and said further member being supported by the frame at the rear of said tine means to further work the soil, said linkage including resilient means and said resilient means being interconnected to said frame to establish the working level of said further member within limits with respect to said tine means, driving means connected to displace said further member in up and down movements against the opposition of said resilient means, said further member being pivoted upwardly and downwardly on said linkage and said driving means including an eccentric that vibrates said further member, said linkage comprising vertically spaced apart arms and at least one of said arms being resiliently connected to the frame with said resilient means that opposes the up and down movements of the linkage and said further member.

* * * * *